Dec. 11, 1956 C. O. SLEMMONS ET AL 2,773,698
RESILIENT MOUNTING IN THE FORM OF A BUSHING AND AXLE
ASSEMBLY FOR VEHICLE SUSPENSION SYSTEMS AND THE LIKE
Filed Aug. 22, 1952 2 Sheets-Sheet 1
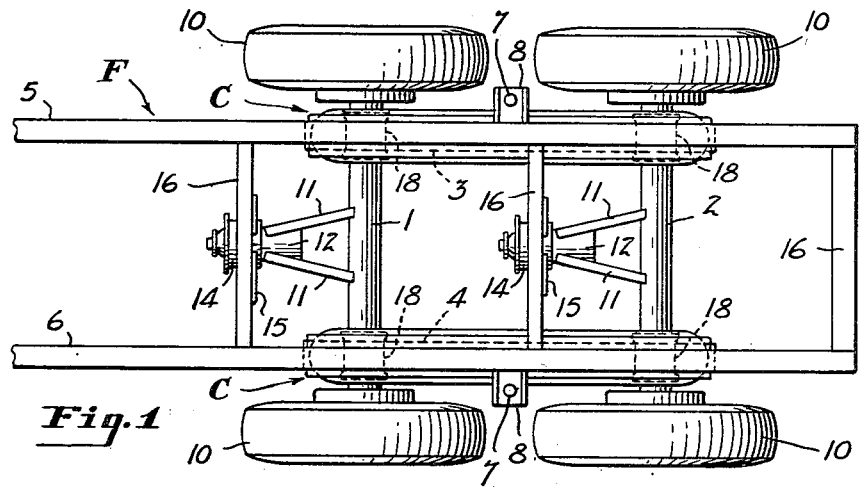
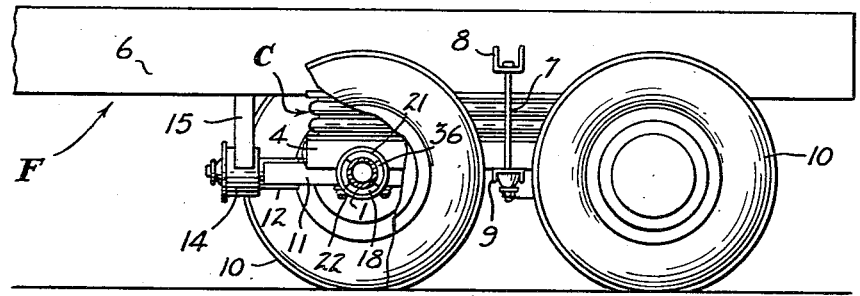
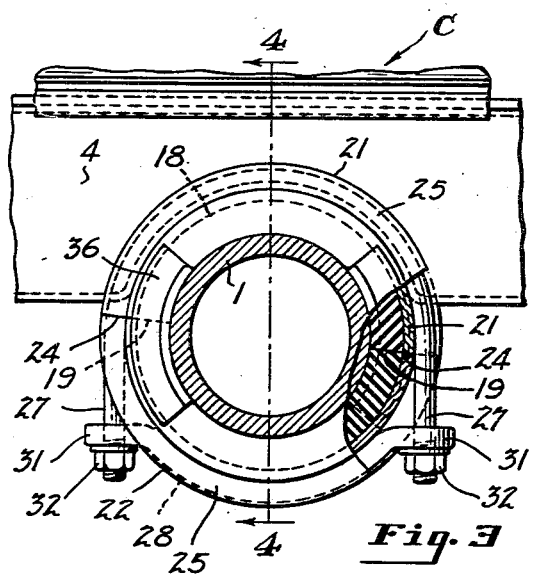
INVENTORS
Charles O. Slemmons
Robert Iredell III
BY Evans + McCoy
ATTORNEYS

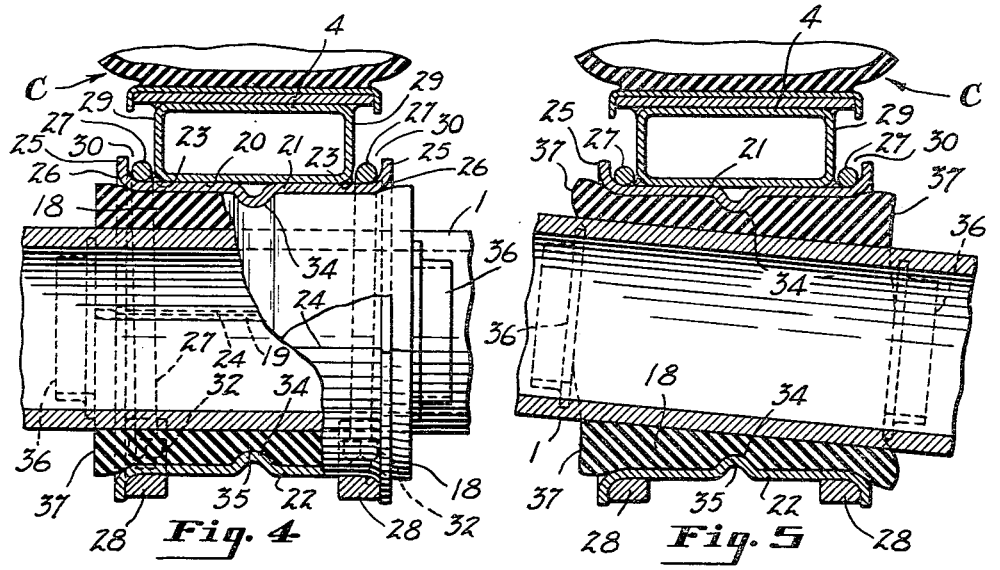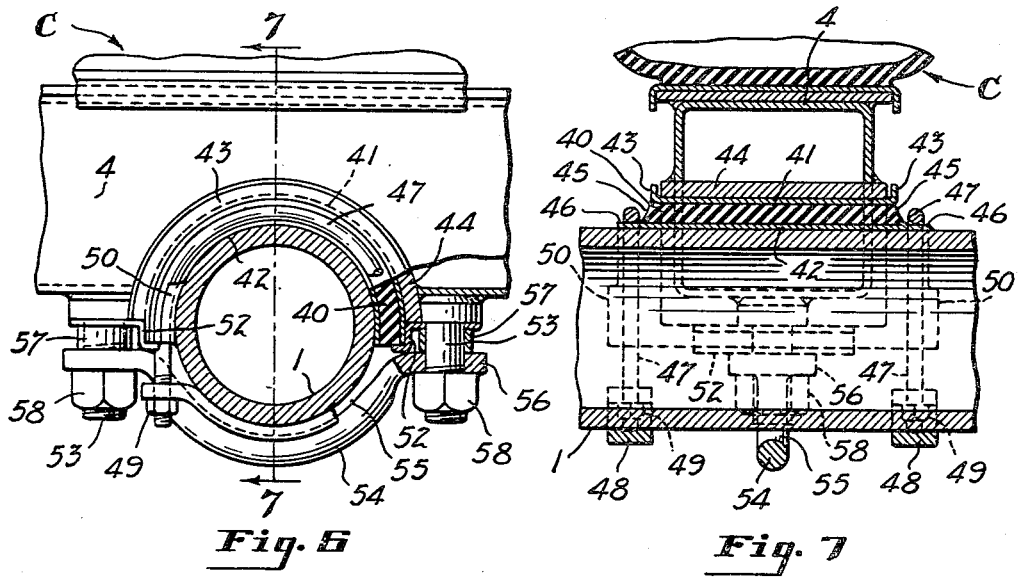

United States Patent Office 2,773,698
Patented Dec. 11, 1956

2,773,698

RESILIENT MOUNTING IN THE FORM OF A BUSHING AND AXLE ASSEMBLY FOR VEHICLE SUSPENSION SYSTEMS AND THE LIKE

Charles O. Slemmons and Robert Iredell III, Akron, Ohio, assignors to The General Tire & Rubber Company, Akron, Ohio, a corporation of Ohio Application August 22, 1952, Serial No. 305,728

11 Claims. (Cl. 280—104.5)

This invention relates to resilient mountings for the axle of vehicle suspension systems and is particularly concerned with mountings for connecting axle members to transversely disposed frame or beam members in such a way as to permit limited twisting, turning and rocking of one member relative to the other. The mounting is of the type that comprises a resilient deformable bushing of arcuate or cylindrically curved shape disposed between the crossed members and has means, either including the bushing or independent thereof, for holding the members together.

Bushing assemblies embodying the principles of the present invention are useful in connecting a member of cylindrical shape, or substantially so, to another member disposed crosswise thereof. These connector assemblies are particularly useful in joining the axles of heavy highway vehicles to the frame or other transverse members of suspension systems of the type shown in co-pending applications for patents, Serial No. 142,428 now Patent No. 2,742,301, filed February 4, 1950, for "Vehicle Suspension," and Serial No. 301,735, filed July 30, 1952.

Vehicle axles, besides being maintained under continuous stress due to the load carried, are subjected to severe shocks and vibrations, are tilted through various angles and are rocked bodily from side to side, one end of the axle being raised while the other end is lowered. To accommodate the various and severe stresses thus imposed on the joints connecting the axles to the beams or frame members of a vehicle suspension system, the bushing assembly of the present invention utilizes a cylindrically curved cushion of resilient deformable material. It is one of the principal objects of the invention to provide an improved bushing assembly of the character referred to, in which the cylindrically curved cushion is suitably confined and held against axial shifting while permitting limited rocking and twisting of the axle relative to the beam or frame member.

Another object of the invention is to provide a bushing assembly for connecting a beam and an axle in which a cylindrically curved cushion of rubber or the like is confined between concentric surfaces and is restricted against axial flowing and shifting by retainerrs so located on the axle as to resist distortion of the connection in one plane while permitting distortion or rocking in another or transverse plane. More specifically, it is sought to provide a bushing assembly for connecting a pair of tandem axles to a pair of spaced beams of a vehicle suspension system in the provision of a rectangular running gear frame, the joints at the crossings of the axles and beams permitting vertical rocking of the axles or vertical distortion of the frame and resisting distortion of the frame in a horizontal plane.

In the effectuation of the preceding object the axles are fitted with segmental retainers disposed against the ends of rubber cushion sleeves surrounding the axles, the retainers being located on the front and rear faces of the axles and the ends of the cushions being unconfined, or substantially so, on the top and bottom faces of the axles.

Another object is to provide in a mounting or joint for crossed members that utilizes a cylindrically curved deformable cushion of rubber or the like, improved means for holding the crossed members together. This aspect of the invention is concerned with the provision of connecting and holding means that is light in weight, easily assembled and adjusted, and capable of being readily inspected and replaced in the field. The invention contemplates the encirclement of one of the crossed members, say the axle of a suspension system, as by a U-bolt and yoke combination, the encircling element or elements making suitable connection with the other of the members, say the beam of such suspension system. According to one arrangement, the connection between the crossed members is effected through the body of the resilient deformable cushion, which may be bonded directly thereto, but preferably to one or more thin metal plates or shells one of which is clamped against the axle member by an encircling element which embraces the latter. In another arrangement the encircling element is interlocked with suitable anchorages on one of the members, say the beam member of a vehicle suspension system, the anchorages desirably taking the form of arcuately curved elements recessed or channeled to receive the encircling elements or means in interfitting relation.

A further object is to provide a bushing assembly of the type employing a cylindrically curved rubber cushion which has cylindrically curved shells of relatively thin metal for confining the cushion. According to one aspect of this phase of the invention, the rubber cushion takes the form of a cylindrical annulus that surrounds the axle of a vehicle suspension system and a pair of semicylindrical metal shells embrace the cushion in companion relation, the shells preferably being of less axial length than the cushion and having radially outwardly directed flanges on their ends. As a further refinement, the shells and their flanges constitute anchorages for fastening means that encircle the axle. According to another aspect of the invention, the rubber cushion, although cylindrical in curvature, is less than completely annular in extent, being, say, semicylindrical. Thin cylindrically curved metal shells are disposed against the inner and outer faces of the semicylindrical cushion in concentric relation to one another, the inner shell being secured to the axle and the outer shell being secured to the beam of the suspension system. The bonds between the rubber cushion and the shells hold the axle and the beam together in normal operation.

A still further object is to provide a resilient bushing assembly for a suspension system, which bushing assembly comprises metal shells bonded to opposite sides of a rubber cushion, one shell being interfitted with and secured in a beam socket in interlocking relation and another shell being clamped to the axle by spaced means encircling the axle.

Other objects and advantages pertain to certain novel features of construction and combinations and arrangements of parts as set forth in the accompanying description of suitable embodiments of the invention. This description is made in connection with the accompanying drawings forming a part of the specification.

In the drawings:

Figure 1 is a fragmentary plan view, partly diagrammatic, showing a portion of the frame and the rear suspension system of a wheeled vehicle, the bushing assembly of the present invention being incorporated in the suspension system;

Fig. 2 is a fragmentary side elevational view of the vehicle frame and suspension system of Fig. 1, this view being partly in section and having parts broken away and removed;

Fig. 3 is a fragmentary sectional detail, with parts broken away and removed, taken transversely through one of the axles of the suspension system shown in Figs. 1 and 2, this view being enlarged with respect to those figures;

Fig. 4 is a sectional detail taken substantially on the line indicated at 4—4 of Fig. 3;

Fig. 5 is a sectional detail similar to Fig. 4, illustrating diagrammatically the action of the resilient bushing upon vertical distortion of the rectangular running gear frame of the suspension system;

Fig. 6 is a sectional detail, with parts broken away and removed, showing a modified bushing assembly, this view corresponding to Fig. 3 of the preceding illustrations; and Fig. 7 is a sectional detail taken substantially along the line indicated at 7—7 of Fig. 6.

In vehicle suspensions of the character referred to a pair of spaced parallel axles 1 and 2 are connected by parallel beam members 3 and 4 in the provision of a rectangular running gear frame. Interposed between the running gear frame and side members 5 and 6 of vehicle frame F are multiple cell pneumatic cushions C. The cushions extend the full length of the beams 3 and 4 and are inflated under suitable controls to support the vehicle frame F at the desired height under any particular loading conditions. Inextensible ties, which may take the form of steel rods 7, are connected between brackets 8 secured to and projecting outwardly from the vehicle frame members 5 and 6 and stirrups 9 secured to the running gear beams 3 and 4 approximately midway between the axles 1 and 2.

The axles are each connected to the vehicle frame by a combined tow bar and torque arm structure. Each torque arm comprises a pair of forwardly extending steel channels 11, the rear ends of which are welded or otherwise secured to spaced points of the axles. The forward ends of these channels are received against opposite sides of a hollow cylindrical steel tube member 12 that extends axially into a larger drumlike steel housing 14. This housing is secured between the lower extremities of metal arms 15 depending from a cross-member 16 of the vehicle frame F. The connection of the cylindrical arm member 12 within the housing 14, while serving to resist turning of the axle and movement of the suspension system longitudinally of the vehicle, incorporates resilient cushion members to permit limited twisting and turning of the torque arm, so that the axle to which the torque arm is connected can move up and down and rock from side to side as the vehicle travels over rough terrain.

The connection of each of the axles 1 and 2 to each of the suspension beams 3 and 4 comprises a resilient member caged in place and interposed between the axle and the beam so as to bear the vehicle weight. This resilient member, in one embodiment of the invention, takes the form of a completely annular rubber sleeve 18 which in its normal molded or unstressed form is cylindrical and of uniform section, or substantially so, from end to end. It thus lends itself to economical manufacture as by an extruding process or by shaping in inexpensive cylindrical molds using cylindrical cores.

The rubber of which the sleeves 18 are formed is compounded for normal use so as to have a stiffness slightly greater than that employed in the tread portions of pneumatic vehicle tires, the particular application for which the bushing is intended governing the composition of the rubber. For extremely heavy loads the composition may be stiffer than that indicated, while for use in suspension systems carrying only light loads, such as in small trucks or passenger vehicles, rubber of less stiffness can be used. While the cushion sleeves 18 can be assembled by sliding them over the ends of the axles 1 and 2, it is preferable to slit the sleeves longitudinally, as shown at 19, so that they may be placed about the axles without removing the wheels 10. Furthermore, and as will later appear, the replacement of worn or damaged cushion sleeves 18 is greatly facilitated when they are split longitudinally, since they may be more readily positioned between the retaining segments.

The beams 3 and 4 are in the form of hollow metal boxes of rectangular cross-section. The under side of each beam, where it crosses the axles, is formed with recesses having cylindrically curved downwardly directed faces 20 that recess the bushing assemblies. The resilient sleeve 18 of each bushing assembly is embraced by a pair of matching semicylindrical shells or retaining members 21 and 22 stamped or forged from high tensile steel. Upper half-shell 21 is received snugly against the arcuate part forming the cylindrical surface 20 of the beam recess. The interfitting socketed relation of the upper shell and the beam thus locates the axle relative to the beam and resists shifting of the axle longitudinally of the beam. Arcuate lines of welding, indicated at 23, or other suitable attaching means, secures the upper of the semicylindrical shells to the beam, the lower half-shell 22 being separable from the upper along parting lines 24. At their ends the shells 21 and 22 have radially outwardly directed integral flanges 25, the junctures between the body portions of the shells and the radial flanges each being curved to a radius, as indicated at 26, to provide smooth, curved surfaces for contact with the rubber of the cushion sleeves 18 when the rectangular suspension frame is distorted, as shown, for example, in Fig. 5. The rubber cushion sleeves 18 are of greater length axially than the confining shells 21—22, the ends of the rubber sleeves projecting axially beyond the ends of the steel retainer shells.

To hold the shells in assembled relation about the sleeves and to thereby grip and secure the embraced axle in desired relation to the beam, the shell halves are embraced at their ends by steel U-bolts 27 and cast metal yoke members 28. The shells are made long enough to extend beyond side faces 29 of the beams, providing channel-like clearance spaces 30 between the beam side faces and the radial flanges 25 of the upper half-shells 21. The curved portions of the U-bolts 27 are received in the channel spaces 30, thereby locating and retaining the U-bolts in predetermined positions axially of the shell halves and adjacent the radial flanges at the ends of the latter. The yokes 28 are contoured to the cylindrical shape of the lower shell halves 22 and are formed with oppositely directed ears 31, apertured to receive the U-bolt ends. Nuts 32 threaded onto the U-bolts draw and hold the parts together, the shell halves 21 and 22 being thus forced together along the parting lines 24.

The portions of the retainer shells that extend axially beyond the limits of the cylindrical recess in the beam constitute arcuate anchorages of thin section for attachment of the U-bolts 27. The channels 30 in these anchorages are concentric to the surface of the shaft and thus have the same radius of curvature as the bent portions of the U-bolts. Hence in assembling the bushing the holding means in the form of the U-bolts that encircle the axle become interlocked with the thin anchorages and objectionable lateral slippage, twisting and dislocation are avoided. Loosening of the nuts 32 does not result in separation or loss of the parts and retightening restores the unit to service conditions without skilled or specialized assistance.

As an optional refinement of the invention, one or both of the shell halves are formed with circumferentially extending ridges 34 on their inside arcuate surfaces. These ridges are forced into and become embedded in the central portions of the rubber cushion sleeves 18 to clamp the latter tightly over localized circumferentially extending areas midway between the ends of the semicylindrical shells.

As a still further refinement of the interlocking relation between the shell halves and the resilient rubber sleeves, the latter are formed as by molding or cutting with circumferential grooves 35 that accommodate the shell ridges 34. The circumferential ridges 34 may be located in any desired positions along the axial length of the arcuate shells that clamp the rubber sleeves or in multiple along the axial length of the shells. It is preferable, however, to locate a single ridge approximately midway between the ends of the shells, this location being substantially on the neutral axis of the assembly and avoiding objectionable interference between the ridges and the axle when the suspension frame is distorted, as is apparent in Fig. 5.

In its normal or unstressed condition the cushion sleeve 18 is of greater radial thickness than the space between the axle and the cylindrical confining face provided by the shell halves 21 and 22. Thus when the shell halves are clamped about the sleeve the latter is tightly gripped to the extent of being slightly deformed by the shell halves and, in turn, tightly grips the cylindrical surface of the axle embraced thereby. High radial pressures thus develop between the surfaces of the rubber sleeve 18 and both the axle and the retaining shell surfaces, providing strong frictional grips between the rubber sleeve and the cylindrical metal surfaces in contact therewith.

In normal use and for many applications of the invention the frictional grip between the rubber and metal components will suffice to prevent objectionable lengthwise shifting of the axles in the bushings. A more advantageous arrangement, however, and one particularly suited to the stresses encountered, say, in the suspension systems of heavy highway vehicles, employs segmental locators or thrust elements 36 disposed against the ends of the rubber sleeve. These locators are approximately L-shaped in section, having cylindrically shaped flanges that conform to the shape of the axle and radial flanges that are faced flatwise against the ends of the rubber sleeves 18. Each bushing assembly incorporates two pairs of the retaining elements 36, one pair being secured to the front or forward face of the axle and the other pair being secured to the back or rear face of the axle. The elements of each pair are spaced apart along the length of the axle a distance corresponding to the length of the rubber sleeve 18, being thus located in axially spaced relation beyond the corresponding end flanges 25 of the clamping shells. This spacing of the retainers 36 so that their sleeve contacting faces are spaced beyond the ends of the retaining shells avoids contact between the metal parts insulated by the rubber sleeve.

One of the particularly improved features of the present suspension frame and deformable bushing combination as compared with similar structures of the prior art is concerned with the location of the segmental retaining elements 36. Secured as they are to the front and rear faces of the axles these retaining elements are disposed in the plane of the running gear frame. This relationship of parts permits the rubber of the cushion sleeve 18 to flow axially along the top and bottom of the axle beyond the plane of the radial confirming surface or flange of the retainer elements 36. This outflowing of the rubber sleeve is illustrated in Fig. 5 which represents, somewhat diagrammatically, the relationship between one of the beams and one of the axles on which it is supported when the rectangular running gear frame of the suspension system is twisted during travel over an uneven roadway or rough terrain.

Each segmental retainer 36 extends circumferentially about the axle on which it is mounted only a fractional part of the entire circumference of the axle and is thus discontinuous across both the top and the bottom of the axle, as shown in Fig. 2. The top and bottom portions of the end faces 37 of the rubber sleeve 18 are substantially unconfined and are thus permitted to flow axially when squeezed as by distortion of the suspension frame. The circumferential extent of each of the arcuate retainer segments 36 is of the order of about 90°, which has been found satisfactory for a normal use highway vehicle suspension system. Where particularly rough terrain is to be traveled retainers 36 of less than 90° extent, as little as 60° to 80° or less circumferential extent, are satisfactory.

Since the segmental retainer elements 36 are secured to the front and rear sides of the axles and are thus located in the horizontal plane of the axles they resist flowing or deforming of the rubber cushion element 37 resulting from horizontal distortion of the running gear frame. Location of the retainer segments on the front and rear faces of the axles, the segment being discontinuous across the top and bottom faces of the axles, is effective to stiffen the bushing assembly against distortion of the running gear frame in the horizontal axle plane while permitting relatively free or unimpeded flow or distortion of the rubber bushing sleeve in vertical distortion of the running gear frame. It is apparent, of course, that the particular cross-sectional shape of the segmental retaining elements 36 is not critical, it being feasible to use arcuate bars or rods of rectangular or square shape as well as the L section shown.

In Figs. 6 and 7 is illustrated a modification of the invention employing a rubber cushion element 40 which is semicylindrical. A semicylindrical outer shell 41 and a semicylindrical inner shell 42 are bonded to the outer and inner faces, respectively, of the rubber element, the shells being formed of thin metal plate and the bonds being effected by vulcanization during the curing of the rubber cushion element in a conventional molding process. The metal shells illustrated are concentric and the rubber cushion element is of uniform section and thickness throughout its circumferential extent, although other shapes can be employed.

The outer shell 41 is received within a cylindrically curved steel bearing plate 44, welded to the beam 3 (or the beam 4, as the case may be) the bearing plate providing a cylindrically shaped socket or recess for receiving and locating the axle of the suspension system. At its opposite ends the shell 41 is formed with angularly disposed outwardly directed flanges 43 that embrace the parallel end faces of the bearing plate. The outer shell 41 is thus channel-shaped in longitudinal cross-section and receives the arcuate bearing plate 44 in interlocking relation to locate the parts in assembly and to resist shifting of the beam along the axle.

The inner cylindrical shell 42 is of greater axial length than the outer shell 41 and extends beyond end faces 45 of the rubber cushion element 40, providing arcuate seats 46 for steel U-bolts 47. Each of the U-bolts receives an arcuately curved yoke, the yoke being apertured at its ends to receive the U-bolt ends and nuts 49 being threaded on the bolt ends to tighten the yokes against the underside of the axle. The U-bolts and yokes thus constitute holding means that encircle the axle in spaced parallel planes and clamp the inner shell 42 of the cushion element assembly against the cylindrical face of the axle. As a further and optional means of securement, the ends of the inner shell 42 are welded to the front and rear faces of the axle 1 (or 2, as the case may be) as indicated at 50. These arcuate lines of welding are of relatively short circumferential extent about the axle, being discontinuous across the top and bottom faces of the axle and thus located adjacent the neutral axis of the axle, where the bending stresses are at a minimum.

The side faces of the outer shell 41, located substantially in diametric relation to one another, project below the corresponding faces of the plate 44 and are supported by brackets 52 carried by studs 53 welded or otherwise secured to the underside of the beam 3 (or 4, as the case may be). The studs 53, disposed one on each side of the axle 1 (or 2, as the case may be), are connected by an arcuate safety yoke 54 that is separated from the surface of the axle by a circumferentially extending clearance space 55. The yoke 54 has angularly disposed ends 56, apertured to receive the studs, spacing collars 57 being interposed between the yoke ends and the brackets 52 to maintain the clearance 55 when the parts are drawn up on the studs by nuts 58.

By reason of the vulcanized bond between the rubber cushion element 40 and each of the arcuate plate metal shells 41 and 42, migration or creeping of the rubber cushion during working of the joint is eliminated. Stresses tending to shift the beam 3 (or 4, as the case may be) longitudinally of the axle on which it is supported are resisted wholly by the vulcanized bonds between the rubber cushion and the shells.

The clearance 55 between the yoke 54 and the bottom of the axle permits twisting and moving of the axle relative to the beam, such as occurs in distortion of the rectangular running gear frame. In the event of extreme distortion of the frame or relative movement of the axle away from the beam the axle is engaged by the yoke 54, which thus functions as a safety device interlocking the axle to the beam and preventing excessive distortion and failure of the rubber cushion 40. The use of a single safety yoke 54 in encircling relation to the axle and the location of the single yoke in the median plane of the beam to which it is secured accommodate the rocking action or motion of the axle relative to the beam, such as occurs in vertical distortion of the running gear frame.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim and desire to secure by Letters Patent of the United States is:

1. A vehicle suspension system of the type comprising a pair of spaced generally parallel axles for mounting wheels, one axle being located ahead of the other, a pair of spaced beam members extending between and connecting the axles in the provision of a running gear frame, and resilient means interposed between the running gear frame and the body of the vehicle, said system being characterized by deformable bushing assemblies in the connection of each axle to each beam member, said bushing assemblies each comprising a resilient deformable cushion confined between the axle and the beam and extending circumferentially with respect to the axle so that pressure on the cushion due to vertical or horizontal distortion of the running gear frame forces the cushion to flow axially along the axle, and retainer means mounted on the axle and engageable with an end portion of the resilient cushion, said retainer means being located at the sides of the axle to restrain axial flow of the cushion induced by horizontal distortion more than that induced by vertical distortion of the running gear frame.

2. A vehicle suspension system of the type comprising a pair of spaced generally parallel axles for mounting wheels, one axle being located ahead of the other, a pair of spaced rigid beam members extending between and connecting the axles in the provision of a running gear frame, and resilient means interposed between the running gear frame and the body of the vehicle, said system being characterized by deformable bushing assemblies in the connection of each axle to each beam member, said bushing assemblies each comprising a cylindrically shaped tubular sleeve cushion of resilient deformable material surrounding the axle and interposed between the axle and the beam, means rigid with the beam surrounding the cushion so that distortion of the running gear frame forces the cushion to flow axially along the axle, and retainer means mounted on the axle for engaging an end portion of the cushion extending substantially less than the full circumference of the cushion to restrain axial flow of the cushion induced by horizontal distortion more than that induced by vertical distortion of the running gear frame.

3. In a vehicle suspension system of the type comprising axles and beams crossing one another and connected together at the crossing point in the provision of a running gear frame for mounting the vehicle wheels, the axles normally being disposed in a common plane and subject to displacement from said plane upon distortion of the frame in working of the suspension system during travel of the vehicle over rough terrain, means for connecting the axles to the beams at each of the crossing points, said connecting means comprising a resilient deformable cushion interposed between the axle and the beam, clamping means for drawing the axle and the beam together and imposing a deforming stress on the cushion, and retainers secured to the axle and disposed against the ends of the deformable cushion, said retainers being disposed in the plane of the axles of the suspension system to resist movement of the deformable cushion along the axle occasioned by distortion of the running gear frame in the plane of the axles and said retainers being discontinuous across the top and bottom of the axle to permit movement of the deformable cushion along the axle occasioned by distortion of the running gear frame in said working of the suspension system.

4. A bushing assembly for connecting a longitudinal beam member of a vehicle suspension system to a horizontal transverse wheel carrying axle supporting the beam, an arcuate part providing a substantially cylindrically shaped socket in the beam for receiving the axle in spaced relation, said assembly comprising a resilient arcuately curved rubber cushion concentric to and interposed between the axle and the arcuate part and located in said socket, a thin sectioned arcuately curved metal shell disposed in said socket and secured to said arcuate part, said metal shell being on the outside of the cushion and having end portions extending axially beyond the socket, the central portion of said shell being formed with a circumferentially extending ridge on its inside surface that engages a circumferential groove formed in the central portion of the cushion approximately midway between the ends of the shell, said ridge being forced into and embedded in the central portion of the cushion to clamp the latter tightly over localized circumferentially extending areas, and means adjacent said beam member and encircling the shell, the embraced cushion and the axle, said encircling means being contractible about the shell to clamp the cushion sleeve about the axle, said metal shell being secured to said arcuate part solely by means independent of said encircling means.

5. In a bushing assembly for connecting a longitudinal beam member of a vehicle suspension system to a horizontal transverse cylindrical axle supporting the beam, an annular rubber cushion sleeve of substantially cylindrical shape disposed in embracing relation about the axle, metal shell means conforming to the shape of the cushion sleeve disposed in embracing relation about the latter, means securing the shell means to the beam member, pairs of segmental members secured to the front and rear faces only of the axle at both ends of the cushion sleeve and extending circumferentially about the axle only a fractional part of the entire circumference thereof, said segmental members being disposed for engagement by the end faces of the cushion sleeve to resist axle flow of the cushion sleeve during working of the assembly, the top and bottom portions of said end faces being substantially unconfined so that they may flow axially when the cushion sleeve is squeezed during working of the assembly.

6. In a bushing assembly for connecting a beam member of a vehicle suspension system to a horizontal transverse cylindrical axle supporting the beam, an annular rubber cushion sleeve of substantially cylindrical shape disposed in embracing relation about the axle, metal shell means conforming to the shape of the cushion sleeve disposed in embracing relation about the latter, means securing the shell means to the beam member, pairs of segmental members secured to the front and rear faces only of the axle at both ends of the cushion sleeve and extending circumferentially about the axle from about one third to about one half the entire circumference of the axle, each of said segmental members extending circumferentially from about 60° to about 90° and being disposed for engagement by the end faces of the cushion sleeve to resist axial flow of the cushion sleeve during working of the assembly, the top and bottom portions of said end faces being substantially unconfined so that they flow axially when the cushion sleeve is squeezed during working of the assembly.

7. A bushing assembly as for connecting a longitudinal beam member of a vehicle suspension system to a transverse wheel carrying axle supporting the beam, said beam member having an arcuate transverse recess on the underside thereof for receiving the axle in spaced relation, an annular rubber cushion sleeve formed by a plurality of arcuate rubber cushion members concentric to said axle, said sleeve being located in said recess and being interposed between said beam member and said axle, a metal sleeve comprising plural shells of metal collectively substantially surrounding and confining said cushion sleeve, one of said shells being secured to said beam member and disposed in the recess, said metal sleeve having its opposite end portions extending axially beyond the sides of said beam member and having radially outwardly directed integral flanges located on said end portions and spaced axially from said beam member, said rubber sleeve extending axially beyond the radial flanges, and radially detachable clamping members encircling the opposite end portions only of said metal sleeve between the radial flanges and the beam member to hold said plural shells together and to clamp the shells about the rubber sleeve and the axle, said one of said shells being secured to said beam member solely by means independent of said clamping means.

8. A bushing assembly as for connecting a longitudinal beam member of a vehicle suspension system to a transverse wheel-carrying axle member supporting the beam member, said beam member having an arcuate transverse recess on the underside thereof for receiving the axle member in spaced relation, a hollow metal part having an arcuate portion in said recess, a resilient and deformable rubber-like cushion in said recess engaging the curved surface of said part and held against axial movement relative to said part, said cushion and said part being concentric to said axle member and interposed between the axle member and said beam member to position the axle relative to the beam, said part engaging one of said members and having opposite end portions extending axially beyond the opposite sides of said beam member, means for securing said part to said one of said members and for preventing axial movement of said part relative to said one of said members including U-bolts having curved central portions engaging the opposite end portions only of said part and having leg portions extending downwardly away from said beam member on opposite sides of the axle, said bolts encircling said opposite end portions and said axle on opposite sides of said beam member.

9. An assembly as defined in claim 8 wherein said hollow part comprises plural shells of metal collectively substantially surrounding and confining said cushion sleeve.

10. An assembly as defined in claim 8 wherein said part comprises a segmental shell of relatively thin metal secured to said beam member by means of stud means projecting from said member on opposite sides of the axle and by means of bracket means carried by the stud means and engaging the shell, said stud means carrying a bar that straddles the axle across the under side of the latter opposite the shell, and wherein said cushion extends axially beyond the radial shell flanges.

11. An assembly as defined in claim 8 wherein a metal shell is bonded to the radially outer face of said cushion and secured to said beam member to locate and retain the cushion in fixed position relative to the beam, and wherein said part comprises a metal shell bonded to the radially inner face of said cushion and disposed in bearing relation against the axle, the end portions of said last-mentioned shell extending axially beyond the ends of said rubber cushion for engagement with said U-bolts.

References Cited in the file of this patent
UNITED STATES PATENTS

| | | |
|---|---|---|
| 1,452,693 | Lord | Apr. 24, 1923 |
| 1,575,118 | Lipcot | Mar. 2, 1926 |
| 1,692,891 | Fageol | Nov. 27, 1928 |
| 1,830,149 | Weinhardt | Nov. 3, 1931 |
| 1,939,155 | Wise | Dec. 12, 1933 |
| 2,122,839 | Guy | July 5, 1938 |
| 2,251,416 | Parker | Aug. 5, 1941 |
| 2,342,577 | Gehman | Feb. 22, 1944 |
| 2,456,719 | Martin | Dec. 21, 1948 |

FOREIGN PATENTS

| | | |
|---|---|---|
| 674,561 | France | Oct. 22, 1929 |
| 146,716 | Great Britain | July 15, 1920 |